(12) United States Patent
Sakai et al.

(10) Patent No.: US 10,731,890 B2
(45) Date of Patent: Aug. 4, 2020

(54) AIR CONDITIONING OPERATION ANALYSIS DEVICE AND NON-TRANSITORY COMPUTER-READABLE RECORDING MEDIUM STORING PROGRAM

(71) Applicant: Mitsubishi Electric Corporation, Tokyo (JP)

(72) Inventors: Eri Sakai, Tokyo (JP); Hiroko Izumihara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 20 days.

(21) Appl. No.: 15/740,552

(22) PCT Filed: Aug. 20, 2015

(86) PCT No.: PCT/JP2015/073362
§ 371 (c)(1),
(2) Date: Dec. 28, 2017

(87) PCT Pub. No.: WO2017/029755
PCT Pub. Date: Feb. 23, 2017

(65) Prior Publication Data
US 2018/0195755 A1 Jul. 12, 2018

(51) Int. Cl.
*F24F 11/46* (2018.01)
*F24F 11/89* (2018.01)
(Continued)

(52) U.S. Cl.
CPC ............. *F24F 11/89* (2018.01); *F24F 11/46* (2018.01); *F24F 11/54* (2018.01); *F24F 11/63* (2018.01);
(Continued)

(58) Field of Classification Search
CPC .. F24F 11/89; F24F 11/63; F24F 11/46; F25B 2500/18; F25B 2500/19
(Continued)

(56) References Cited

U.S. PATENT DOCUMENTS

2004/0260490 A1  12/2004 Matsubayashi et al.
2015/0041550 A1* 2/2015 Honda ............... G05D 23/1932
                                                    236/51

FOREIGN PATENT DOCUMENTS

JP  2005-032235 A  2/2005
JP  2006-214637 A  8/2006
(Continued)

OTHER PUBLICATIONS

International Search Report of the International Searching Authority dated Nov. 2, 2015 for the corresponding international application No. PCT/JP2015/073362 (and English translation).
(Continued)

*Primary Examiner* — Elizabeth J Martin
*Assistant Examiner* — Nael N Babaa
(74) *Attorney, Agent, or Firm* — Posz Law Group, PLC

(57) ABSTRACT

An air conditioning operation analysis device includes: an air conditioning operation data acquirer that acquires air conditioning operation data of at least one air conditioner installed in a room, a room information acquirer that acquires room information indicating a configuration of the room, an environmental information data acquirer that acquires environmental information data from at least one sensor arranged in the room, and an outputter that outputs heat load data that is calculated based on the acquired air conditioning operation data, the acquired room information, and the acquired environmental information data.

9 Claims, 19 Drawing Sheets

(51) Int. Cl.
*G06Q 50/00* (2012.01)
*G06Q 50/16* (2012.01)
*G06Q 10/08* (2012.01)
*G06Q 50/06* (2012.01)
*G06Q 50/28* (2012.01)
*G06Q 10/06* (2012.01)
*F24F 11/63* (2018.01)
*F24F 11/54* (2018.01)
*H02J 13/00* (2006.01)
*H05B 47/19* (2020.01)
*F24F 140/60* (2018.01)

(52) U.S. Cl.
CPC ............. *G06Q 10/06* (2013.01); *G06Q 10/08* (2013.01); *G06Q 50/00* (2013.01); *G06Q 50/06* (2013.01); *G06Q 50/16* (2013.01); *G06Q 50/28* (2013.01); *H02J 13/0062* (2013.01); *F24F 2140/60* (2018.01); *H05B 47/19* (2020.01)

(58) Field of Classification Search
USPC ........................................................ 700/300
See application file for complete search history.

(56) References Cited

FOREIGN PATENT DOCUMENTS

| | | | |
|---|---|---|---|
| JP | 2008-249206 A | 10/2008 | |
| JP | 2008249206 A * | 10/2008 | |
| JP | 2014-142686 A | 8/2014 | |
| JP | 2014142686 A * | 8/2014 | ............. F24F 11/30 |
| WO | 2015/004742 A1 | 1/2015 | |
| WO | 2015/119119 A1 | 8/2015 | |

OTHER PUBLICATIONS

Office Action dated Oct. 16, 2018 issued in corresponding JP patent application No. 2017-535214 (and English translation).
Office Action dated Oct. 18, 2018 issued in corresponding EP patent application No. 15901737.5.
Extended European Search Report dated May 15, 2018 issued in corresponding EP application No. 15901737.5.
Office Action dated Sep. 24, 2019 issued in corresponding CN patent application No. 201580082533.1 (and English translation).

* cited by examiner

| DATE AND TIME (D20) | SENSOR 1 (D21) | | SENSOR 2 (D22) | | SENSOR 3 (D23) | |
|---|---|---|---|---|---|---|
| | TEMPERATURE (°C) (D211) | HUMIDITY (%) (D212) | TEMPERATURE (°C) (D221) | HUMIDITY (%) (D222) | EXTERNAL AIR TEMPERATURE (°C) (D231) | SUNSHINE DURATION (%) (D232) |
| 201408201100 | 27.4 | 66.2 | 27.1 | 66.3 | 28.1 | 100 |
| 201408201101 | 27.3 | 66.2 | 27.0 | 66.3 | 28.2 | 100 |
| 201408201102 | 27.3 | 66.1 | 27.1 | 66.4 | 28.2 | 96 |
| 201408201103 | 27.3 | 66.1 | 27.1 | 66.4 | 28.3 | 95 |
| 201408201104 | 27.3 | 66.3 | - (D221a) | 66.3 | 28.2 | 91 |
| 201408201105 | 27.5 | 66.2 | 27.2 | 66.3 | 28.2 | 98 |

FIG. 7

| D3 | | | | |
|---|---|---|---|---|
| D31 LIGHTING DATA | LIGHTING EQUIPMENT 1 | LIGHTING EQUIPMENT 2 | LIGHTING EQUIPMENT 3 | LIGHTING EQUIPMENT 4 |
| POWER CONSUMPTION (W) | 200 | 200 | 100 | 100 |
| BRIGHTNESS (%) | 80 | 80 | 80 | 80 |
| D32 VENTILATION DATA | VENTILATION EQUIPMENT 1 | VENTILATION EQUIPMENT 2 | VENTILATION EQUIPMENT 3 | VENTILATION EQUIPMENT 4 |
| AIR-FLOW VOLUME (m3/min) | 6.04 | 6.04 | 6.04 | 6.04 |
| HEAT EXCHANGE RATE (%) | 70 | 70 | 70 | 70 |

| EXISTING AIR CONDITIONER TYPE ||| | | |
|---|---|---|---|---|
| SYSTEM 1 (MODEL NO. AA-10) || OUTDOOR UNIT 1 | INDOOR UNIT 1 | INDOOR UNIT 2 |
| MINIMUM DRIVE FREQUENCY || 19 | - | - |
| MAXIMUM DRIVE FREQUENCY || 97 | - | - |
| FLOW VELOCITY (m/s) | x DIRECTION | - | 10 | 10 |
| | y DIRECTION | - | 10 | 10 |
| | z DIRECTION | - | 1 | 1 |
| TEMPERATURE EFFICIENCY || 70 | 70 | 70 |
| POWER CONSUMPTION AT RATED AIR FLOW RATE (kW) || 0.2 | 0.2 | 0.2 |

| SYSTEM 2 (MODEL NO. AA-20) || OUTDOOR UNIT 2 | INDOOR UNIT 3 | INDOOR UNIT 4 |
|---|---|---|---|---|
| MINIMUM DRIVE FREQUENCY || 19 | - | - |
| MAXIMUM DRIVE FREQUENCY || 97 | - | - |
| FLOW VELOCITY (m/s) | x DIRECTION | - | 10 | 10 |
| | y DIRECTION | - | 10 | 10 |
| | z DIRECTION | - | 1 | 1 |
| TEMPERATURE EFFICIENCY || 70 | 70 | 70 |
| POWER CONSUMPTION AT RATED AIR FLOW RATE (kW) || 0.2 | 0.2 | 0.2 |

| INSTALLATION CANDIDATE AIR CONDITIONER TYPE | | | | |
|---|---|---|---|---|
| SYSTEM 1 (MODEL NO. AB-10) | | OUTDOOR UNIT 1 | INDOOR UNIT 1 | INDOOR UNIT 2 |
| MINIMUM DRIVE FREQUENCY | | 22 | - | - |
| MAXIMUM DRIVE FREQUENCY | | 98 | - | - |
| FLOW VELOCITY (m/s) | x DIRECTION | - | 12 | 12 |
| | y DIRECTION | - | 12 | 12 |
| | z DIRECTION | - | 1 | 1 |
| TEMPERATURE EFFICIENCY | | 72 | 72 | 72 |
| POWER CONSUMPTION AT RATED AIR FLOW RATE (kW) | | 0.18 | 0.18 | 0.18 |

| SYSTEM 2 (MODEL NO. AB-20) | | OUTDOOR UNIT 1 | INDOOR UNIT 1 | INDOOR UNIT 2 |
|---|---|---|---|---|
| MINIMUM DRIVE FREQUENCY | | 19 | - | - |
| MAXIMUM DRIVE FREQUENCY | | 97 | - | - |
| FLOW VELOCITY (m/s) | x DIRECTION | - | 10 | 10 |
| | y DIRECTION | - | 10 | 10 |
| | z DIRECTION | - | 1 | 1 |
| TEMPERATURE EFFICIENCY | | 70 | 70 | 70 |
| POWER CONSUMPTION AT RATED AIR FLOW RATE (kW) | | 0.2 | 0.2 | 0.2 |

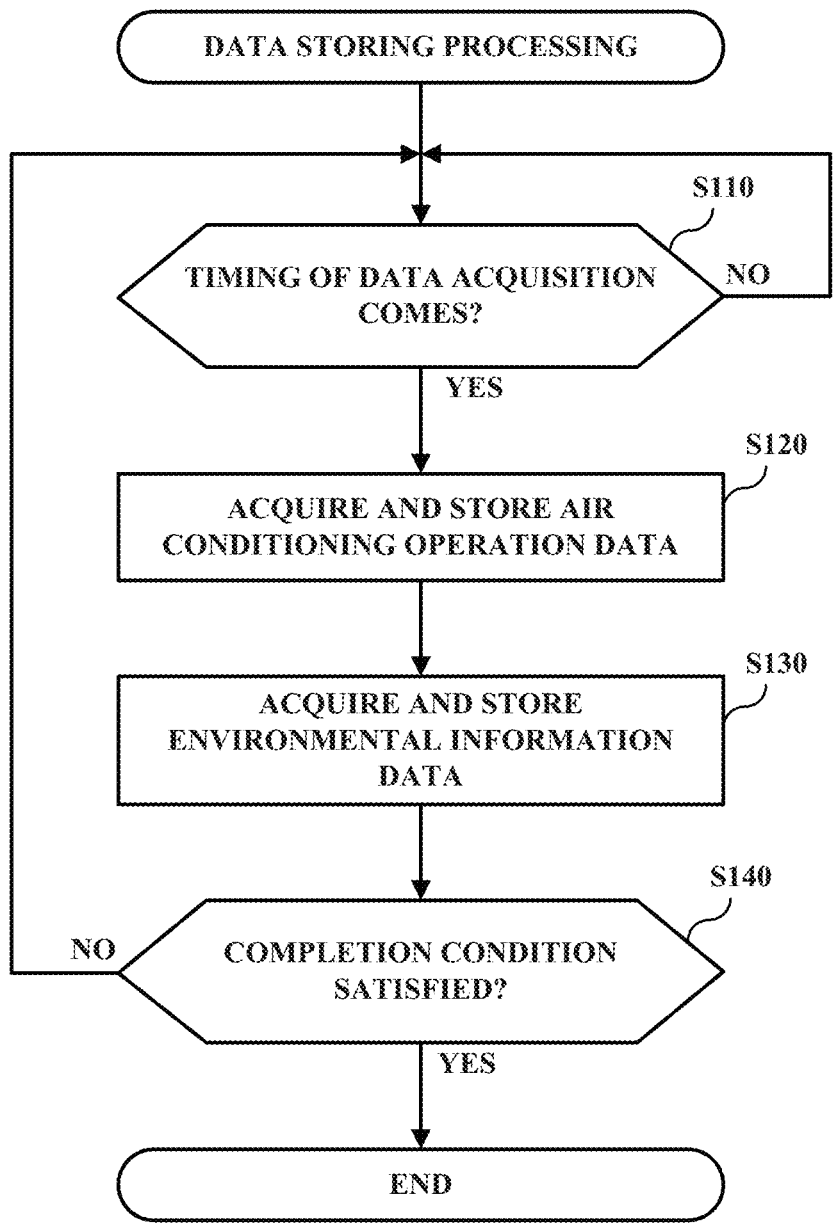

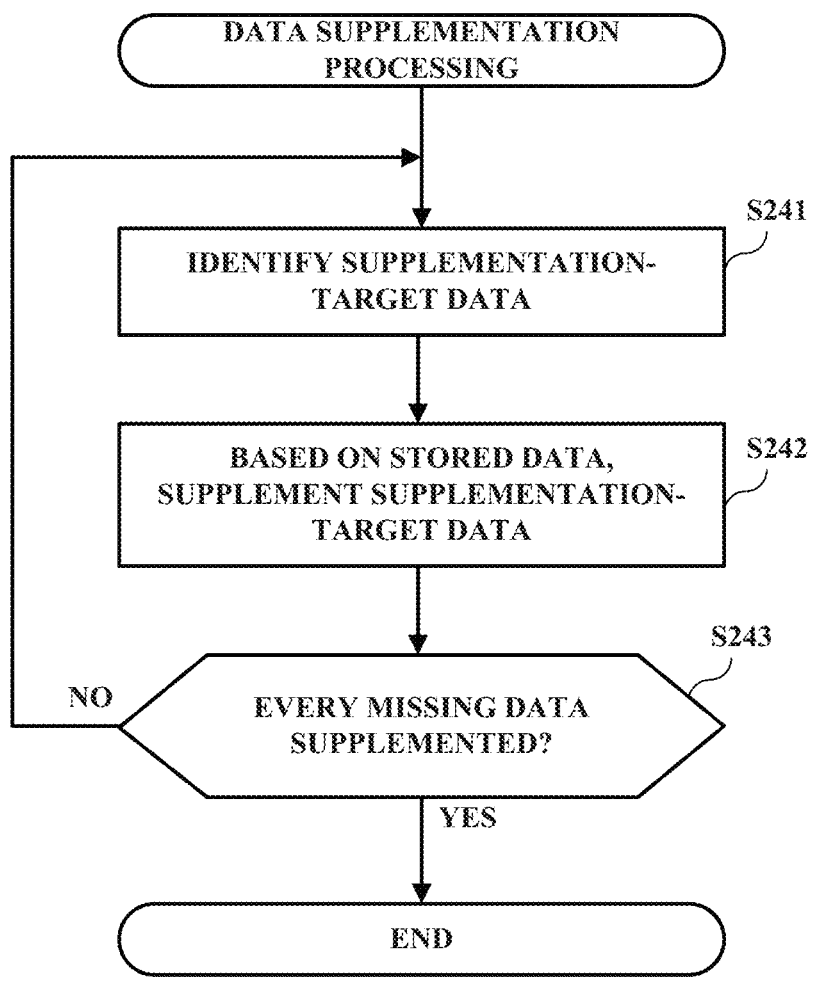

FIG. 14

|  | INDOOR UNIT 1 | INDOOR UNIT 2 | INDOOR UNIT 3 | INDOOR UNIT 4 |  |  |
|---|---|---|---|---|---|---|
| HEAT FLOW (W) | 1562 | 1678 | 2199 | 2250 |  |  |
|  | WALL 1 | WALL 2 | WALL 3 | WALL 4 |  |  |
| HEAT FLOW (W) | 611 | 230 | 458 | 431 |  |  |
|  | WINDOW 1 | WINDOW 2 | WINDOW 3 |  |  |  |
| HEAT FLOW (W) | 255 | 255 | 255 |  |  |  |
|  | CEILING 1 |  |  |  |  |  |
| HEAT FLOW (W) | 3411 |  |  |  |  |  |
|  | FLOOR 1 |  |  |  |  |  |
| HEAT FLOW (W) | 1054 |  |  |  |  |  |
|  | LIGHTING EQUIPMENT 1 | LIGHTING EQUIPMENT 2 | LIGHTING EQUIPMENT 3 | LIGHTING EQUIPMENT 4 |  |  |
| HEAT FLOW (W) | 200 | 200 | 200 | 200 |  |  |
|  | VENTILATION EQUIPMENT 1 | VENTILATION EQUIPMENT 2 | VENTILATION EQUIPMENT 3 | VENTILATION EQUIPMENT 4 | VENTILATION EQUIPMENT 5 | VENTILATION EQUIPMENT 6 |
| HEAT FLOW (W) | 400 | 400 | 400 | 400 | 400 | 400 |

AIR CONDITIONING OPERATION ANALYSIS DEVICE AND NON-TRANSITORY COMPUTER-READABLE RECORDING MEDIUM STORING PROGRAM

CROSS REFERENCE TO RELATED APPLICATION

This application is a U.S. national stage application of International Patent Application No. PCT/JP2015/073362 filed on Aug. 20, 2015, the disclosure of which is incorporated herein by reference.

TECHNICAL FIELD

The present disclosure relates to an air conditioning operation analysis device and a program.

BACKGROUND ART

Various techniques exist for estimating interior heat flows with respect to air conditioning in buildings and the like (for example, Patent Literature 1 and Patent Literature 2).

An energy management apparatus disclosed in Patent Literature 1 estimates a value of an amount of external heat that flows from outside to inside of a building, based on information indicating weather conditions of a region where the building, in which an air conditioner is installed, is located. Then, the energy management apparatus, by comparing the estimated amount of external heat with the air conditioning heat amount calculated from a load current of the air conditioner, attempts to calculate the amount of internal heat being inside of the building.

A simulation device disclosed in Patent Literature 2 attempts to calculate a yearly amount of heat generation and an energy saving index by performing a simulation on the basis of a data table that stores catalog specifications of an air conditioner.

CITATION LIST

Patent Literature

Patent Literature 1: Unexamined Japanese Patent Application Kokai Publication No. 2014-142686
Patent Literature 2: Unexamined Japanese Patent Application Kokai Publication No. 2006-214637

SUMMARY OF INVENTION

Technical Problem

However, there is a problem that with use of the aforementioned techniques, it is difficult to perform a simulation that reflects environmental conditions that are actually measured, and thus the accuracy of estimating incoming and outgoing of heat is insufficient.

With the technique of Patent Literature 1, although a value of external heat amount is estimated on the basis of weather conditions, it is difficult to reflect the detailed indoor environment and site conditions, and the amount of external heat cannot accurately be estimated. Further, although the amount of heat of the air conditioners inside is estimated on the basis of the load current, no simulation is performed that reflects indoor placement of air conditioners (installation locations, number of units, and the like), and accuracy of the estimation of the air conditioning heat amount is insufficient. Thus this technique cannot calculate a heat flow in a room with high accuracy.

The technique disclosed in Patent Literature 2 merely performs a simulation based on data (room temperature, indoor personnel density, lighting electrical power, and the like) as general design conditions, and this technique cannot calculate a value that reflects actual operating results.

An objective of the present disclosure is to solve such problems, and to calculate a heat flow in a room with high accuracy on the basis of the actually detected environmental information and the operating condition for each air conditioner.

Solution to Problem

In order to attain the aforementioned objective, the air conditioning operation analysis device according to the present disclosure includes:
air conditioning operation data acquiring means for acquiring air conditioning operation data of at least one air conditioner installed in a room;
room information acquiring means for acquiring room information indicating a configuration of the room;
environmental information data acquiring means for acquiring environmental information data from at least one sensor arranged in the room; and
outputting means for outputting heat load data that is calculated based on the acquired air conditioning operation data, the acquired room information, and the acquired environmental information data.

Advantageous Effects of Invention

According to the present disclosure, a heat flow in a room can be calculated with high accuracy on the basis of the actually detected environmental information and the operating condition of each air conditioner.

BRIEF DESCRIPTION OF DRAWINGS

FIG. 6 is a drawing illustrating content of environmental information data in the embodiment;
FIG. 7 is a drawing illustrating content of manual input data in the embodiment;
FIG. 9 is a drawing illustrating content of air conditioning capacity data in the embodiment;
FIG. 10 is a drawing illustrating content of air conditioning capacity data in the embodiment;

FIG. 11 is a flowchart illustrating content of data storing processing;

FIG. 13 is a flowchart illustrating content of data supplementation processing;

FIG. 14 is a drawing illustrating content of calculated heat load data;

DESCRIPTION OF EMBODIMENTS

Figure 1:
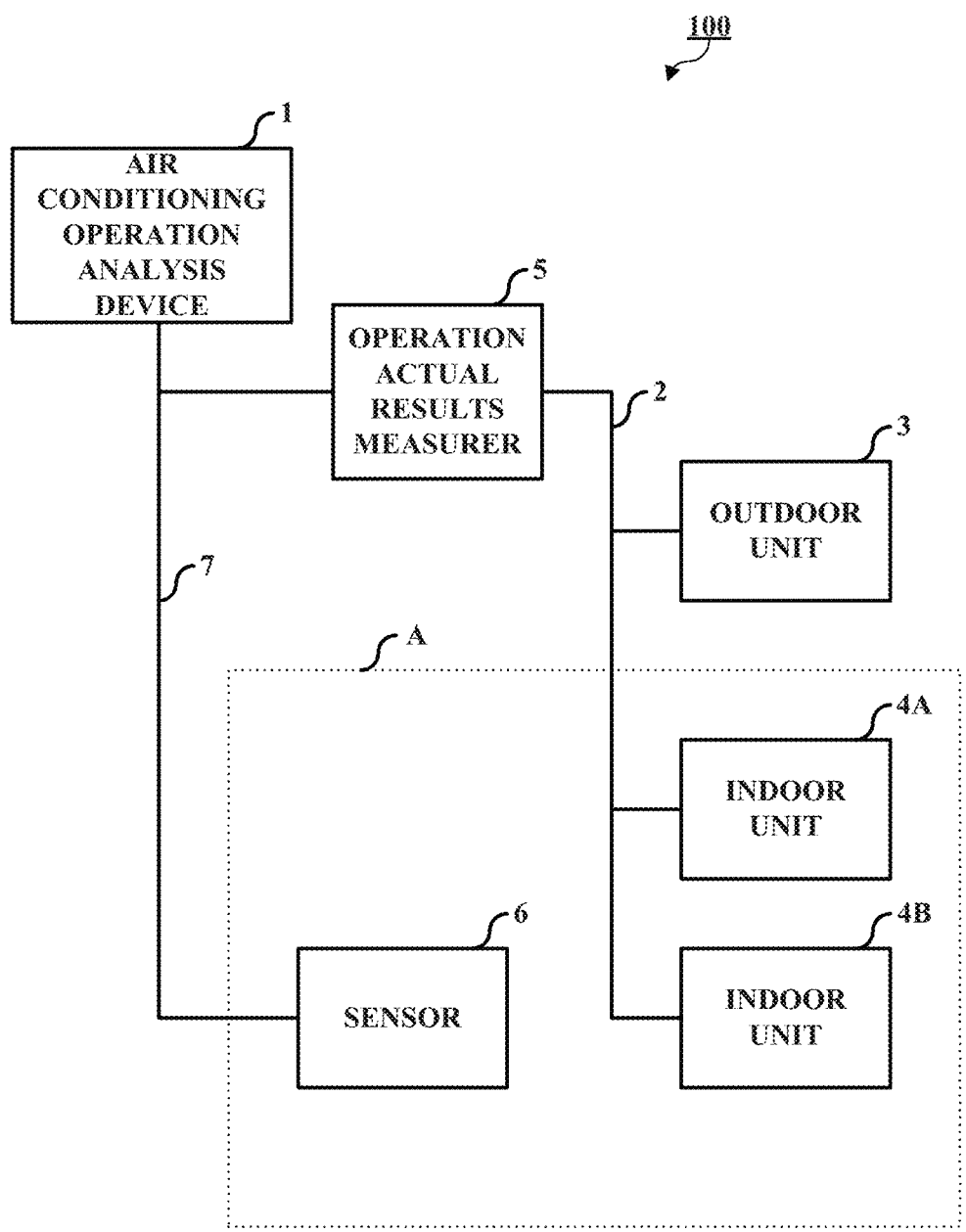
FIG. 1 is a drawing illustrating an overview of an air conditioning analysis system according to an embodiment of the present disclosure.

The embodiment of the present disclosure is described in detail below with reference to the drawings. The same reference signs are used for the same parts throughout the drawings. The terms "up", "down", "left", and "right" are used in the below description with respect to the referred drawings to describe directions. These terms are used merely to facilitate understanding and in no way limit the scope of the present disclosure.

Embodiment

An air conditioning operation analysis device according to the present embodiment has a function of storing: room information indicating a configuration of an air-conditioning-target room, air conditioning operation data of an air conditioner, and environmental information data acquired from a sensor (thermometer or the like) installed in the air-conditioning-target room. Further, this air conditioning operation analysis device, on the basis of the room information, stored air conditioning operation data, and stored environmental information data, simulates what sort of heat flow is in the room, calculates heat load data indicating a heat load of each of components (windows, ventilation equipment, and the like) installed in the room, and outputs the calculated heat load data. The output heat load data includes information indicating a heat load, such as heat flows in the air-conditioning-target room, that is, (i) which components in the room the heat is supplied by and in what amounts the heat is supplied and (ii) which components in the room the heat is released from and in what amounts the heat is released. Thus with reference to the heat load data, in the air-conditioning-target room, for example, (i) which heat sources the heat is supplied by and in what amounts the heat is supplied and (ii) which heat sources the heat is discharged from and in what amounts the heat is discharged can be known.

In the air-conditioning-target room, the amounts of heat supplied to the interior of the room from the components, such as windows and walls, and the amounts of heat flowing to the exterior through such components change in accordance with environmental factors such as the temperature difference between the indoor temperature and the outdoor temperature. Thus in order to accurately estimate such amounts of heat, the air conditioning operation analysis device according to the present embodiment acquires environmental information such as temperature, humidity, and the like via sensors, stores the acquired environmental information, and performs a simulation using such environmental information data.

Further, the air conditioning operation analysis device of the present embodiment stores as air conditioning operation data the running state of the air conditioners involved in air conditioning of the air-conditioning-target room, and uses the stored air conditioning operation data to perform a simulation. That is to say, the air conditioning operation analysis device of the present embodiment calculates heat load data of the room by performing a simulation on the basis of information indicating a configuration of the room (room information), information indicating a running state of the air conditioners (air conditioning operation data), and information indicating changes of the environment (environmental information data).

An air conditioning analysis system 100 according to the present embodiment, as illustrated in FIG. 1, includes: an air conditioning operation analysis device 1; an indoor unit 4A and an indoor unit 4B that are arranged inside a room A that is an air-conditioning-target room; an outdoor unit 3 that performs heat exchange with the indoor unit 4A and the indoor unit 4B; an operation actual results measurer 5 that acquires air conditioning operation data of each of the air conditioners (outdoor unit 3, indoor unit 4A, and indoor unit 4B); and a sensor 6 that is arranged in the room A and acquires environmental information such as temperature, humidity, and the like. The operation actual results measurer 5 is connected via a network 2 to the outdoor unit 3, the indoor unit 4A, and the indoor unit 4B, and is capable of receiving information from and sending information to the outdoor unit 3, the indoor unit 4A, and the indoor unit 4B via the network 2. Further, the air conditioning operation analysis device 1 is connected via a network 7 to the operation actual results measurer 5 and the sensor 6, and is capable of receiving information from and sending information to the operation actual results measurer 5 and the sensor 6 via the network 7.

The indoor unit 4A and the indoor unit 4B are each arranged at a location such as a ceiling portion of the room A and provide a heating function and a cooling function for adjusting temperature of the room A. The indoor unit 4A is connected via refrigerant piping to the outdoor unit 3, and has a function of exchanging heat with the outdoor unit 3 via a refrigerant within the piping. That is to say, via the refrigerant, the indoor unit 4A can supply to the outdoor unit 3 heat obtained from the interior of the room A. The outdoor unit 3 releasing the supplied heat to the exterior enables releasing of the heat in the room A to the exterior and providing of a function of lowering the room temperature (so-called cooling function). Conversely, the indoor unit 4A supplying heat of the exterior taken up by the outdoor unit 3 to the interior of the room A via the refrigerant also enables providing of a function of raising the room temperature (so-called heating function). The indoor unit 4B in the same manner is connected to the outdoor unit 3 via the refrigerant piping, and can supply a cooling function and a heating function to the room A in a similar manner.

Further, although two indoor units (indoor units 4A and 4B) and a single outdoor unit (outdoor unit 3) are illustrated in FIG. 1, the numbers of the indoor units and the outdoor units may be freely selected. That is to say, the air conditioning analysis system 100 according to the present embodiment may include three or more indoor units and/or two or more outdoor units. Further, the interconnections between the indoor and outdoor units may be freely selected.

The operation actual results measurer 5, at predetermined time intervals (such as once per second) collects data (air conditioning operation data) indicating the running state of the connected air conditioners (outdoor unit 3, indoor unit 4A, and indoor unit 4B). Specifically, via the network 2, the operation actual results measurer 5 periodically outputs to each air conditioner a signal corresponding to an instruction to provide the air conditioning operation data, and the operation actual results measurer 5 receives a reply signal from each air conditioner. The air conditioning operation data includes data indicating power consumption for each air conditioner at the time. Additionally, the air conditioning operation data may include information indicating a running mode (cooling or heating), an air-flow volume, and the like. After associating the acquired air conditioning operation data with the time of acquisition of such data, the operation actual results measurer 5 transmits the associated data to the air conditioning operation analysis device 1 via the network 7.

The sensor 6 includes, for example, a temperature-humidity meter, a solarimeter, and the like, and is arranged inside or outside of the air-conditioning-target room A. The sensor 6 acquires the environmental information data indicating conditions (temperature, humidity, sunlight intensity, and the like) at the installation location, and transmits the acquired environmental information data to the air conditioning operation analysis device 1 via the network 7. Further, although only a single sensor (sensor 6) is illustrated in FIG. 1, the number of sensors may be freely selected, and a plurality of sensors may be used. Further, the types of the data to be acquired are not limited to the above-described content (temperature, humidity, sunlight intensity, and the like), and these types may be freely selected.

The air conditioning operation analysis device 1 acquires the air conditioning operation data of the air conditioners (the outdoor unit 3, the indoor unit 4A, and the indoor unit 4B) via the network 7 from the operation actual results measurer 5 included in the air conditioning analysis system 100, and stores the acquired air conditioning operation data. Referring to the power consumption that is of each air conditioner at each time and is included in the air conditioning operation data enables calculation of the amount of heat supplied from each air conditioner to the room at each time and the amount of heat flowing to the exterior via each air conditioner at each time. Further, the air conditioning operation analysis device 1 acquires the environmental information data from the sensor 6, and stores the acquired environmental information data.

The network 2 is any protocol-based network for transmission of information among the connected devices (the operation actual results measurer 5, the outdoor unit 3, the indoor unit 4A, and the indoor unit 4B). The network 2, for example, may be configured based on a wired network protocol as represented by Ethernet (registered trademark), or may be configured based on a wireless communication protocol as represented by wireless fidelity (Wi-Fi, registered trademark). The network 7 may similarly be configured based on any protocol-based network for transmission of information between the air conditioning operation analysis device 1, and the operation actual results measurer 5 and each of the sensors (sensor 6 and the like). Further, although the network 2 and the network 7 exist separately in the present embodiment, these networks may be connected to form a single large network to connect the components.

Figure 2:
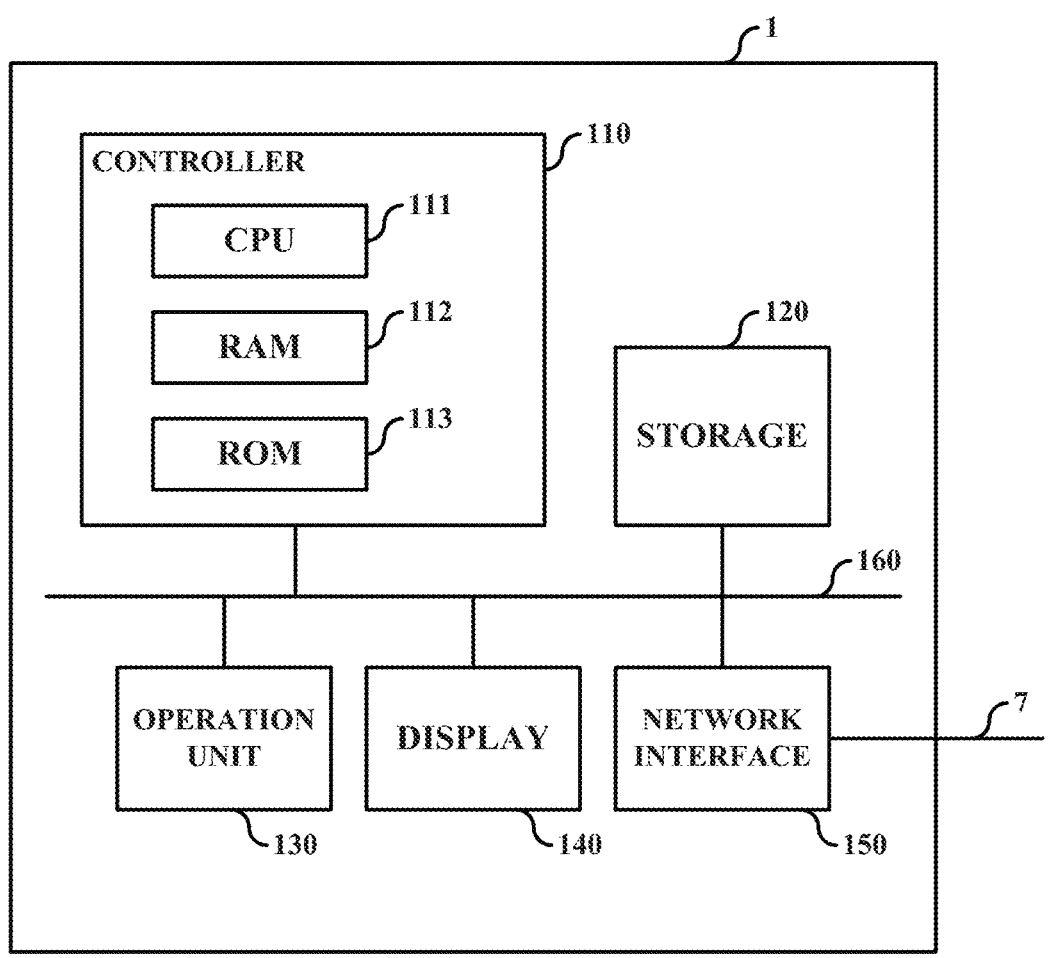
FIG. 2 is a block diagram illustrating a hardware configuration of the air conditioning operation analysis device according to the embodiment.

The air conditioning operation analysis device 1 includes a hardware configuration illustrated in FIG. 2. That is to say, the air conditioning operation analysis device 1 includes a controller 110 that controls overall device operation, a storage 120 that stores data required for controlling the air conditioning operation analysis device 1, an operation unit 130 that receives from a user an operation input to the air conditioning operation analysis device 1, a display 140 that displays to the user required information such as the operation information, and a network interface 150 that connects the air conditioning operation analysis device 1 to the network 7; and the air conditioning operation analysis device 1 is configured to interconnect these components via an internal bus 160.

The controller 110 includes a central processing unit (CPU) 111 operating as a processor, a random access memory (RAM) 112 as a region for storing temporary data, and a read only memory (ROM) 113 in which a control program is stored. The CPU 111 controls overall operation of the air conditioning operation analysis device 1 in accordance with the control program stored in the RAM 112 and the ROM 113. The RAM 112 temporarily stores data used by the CPU 111. The ROM 113 stores the control program. The controller 110 controls these components by receiving signals from and sending signals to the other components included in the air conditioning operation analysis device 1.

The storage 120 includes a non-volatile memory device such as a hard disc drive, flash memory, solid state drive (SSD), and the like, and stores data required for operation of the air conditioning operation analysis device 1. In particular, the aforementioned air conditioning operation data and environmental information data are stored in the storage 120 in a database format.

The operation unit 130 includes a keyboard, mouse, and the like, and receives the input operation by the user and then transmits the input operation to the controller 110.

The display 140 includes a liquid crystal display and the like, and displays information output to the user from the controller 110.

The network interface 150 connects the air conditioning operation analysis device 1 to the network 7. Upon the air conditioning operation analysis device 1 receiving information from the operation actual results measurer 5 or the sensor 6 via the network 7, the network interface 150 transmits to the controller 110 via the internal bus 160 information that is received via the network from other device.

The internal bus 160 relays information between the components (controller 110, storage 120, operation unit 130, display 140, network interface 150, and the like) included in the air conditioning operation analysis device 1. For example, when the controller 110 reads required data from the storage 120, the controller 110 reads the data from the storage 120 via the internal bus 160.

Figure 3:
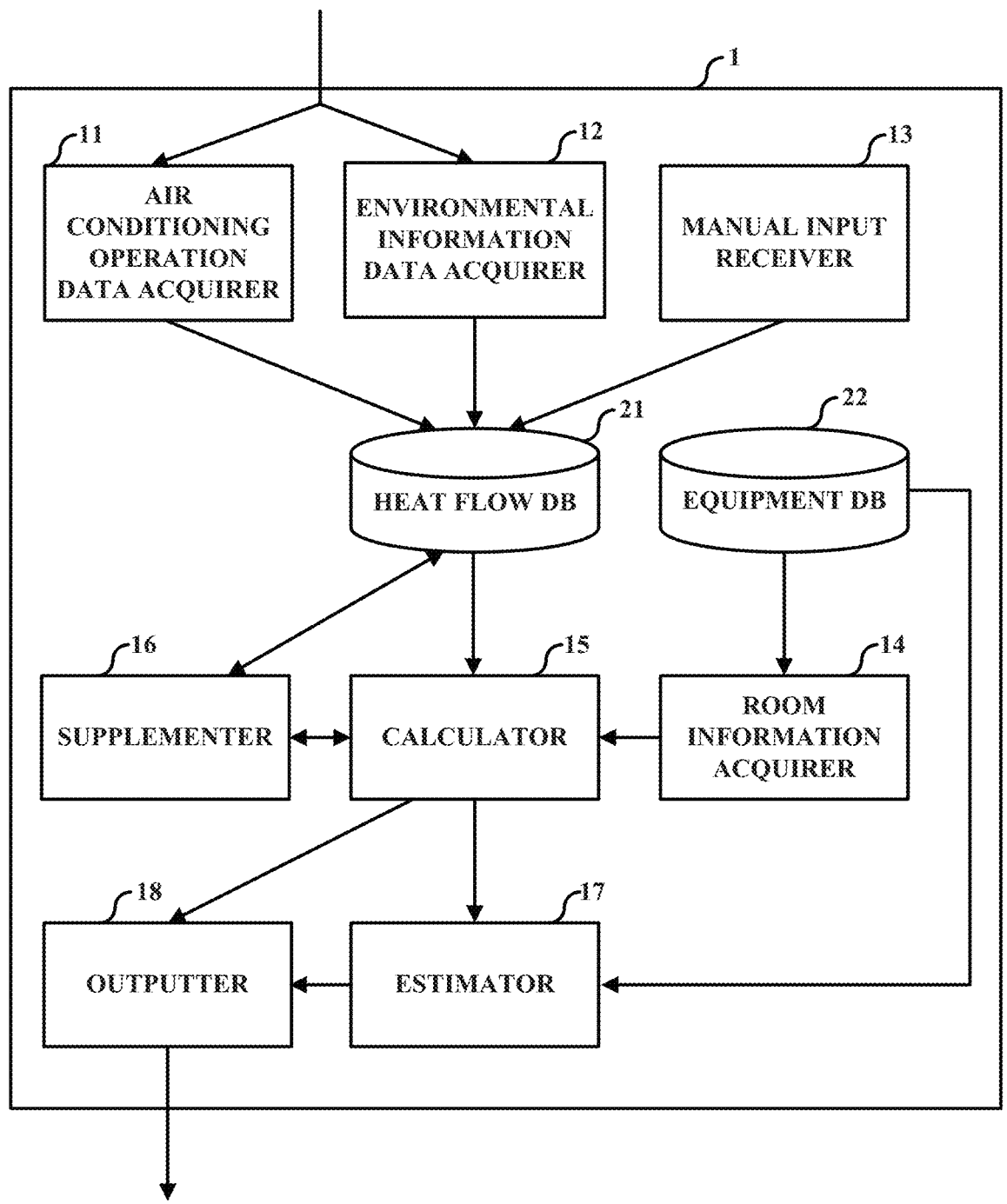
FIG. 3 is a block diagram illustrating functional components provided by the air conditioning operation analysis device according to the embodiment.

By each of the heretofore mentioned hardware components operating cooperatively, the air conditioning operation analysis device 1 achieves operation of each of the functional components illustrated in FIG. 3. Specifically, the air conditioning operation analysis device 1 includes, as required elements, functional components that are an air conditioning operation data acquirer 11, an environmental information data acquirer 12, a room information acquirer 14, and an outputter 18, and further includes databases (herein abbreviated as DB) that store data, such as a heat flow DB 21 and an equipment DB 22. The air conditioning operation analysis device 1 additionally includes optional components, such as a calculator 15, a manual input receiver 13, a supplementer 16, and an estimator 17.

The air conditioning operation data acquirer 11 acquires the air conditioning operation data from the operation actual results measurer 5 via the network 7, and stores the acquired air conditioning operation data in the heat flow DB 21. The air conditioning operation data acquirer 11 consecutively stores the air conditioning operation data transmitted at predetermined time intervals such as once per second from the operation actual results measurer 5.

The environmental information data acquirer 12 acquires the environmental information data from a connected sensor (sensor 6) via the network 7 and stores the acquired environmental information data in the heat flow DB 21. The environmental information data includes information indicating the temperature, humidity, sunlight intensity, and the like detected by the sensor 6. The environmental information data acquirer 12 acquires at predetermined time intervals such as once per second the environmental information data from the sensor 6 and consecutively stores the acquired environmental information data.

The manual input receiver 13 receives an input by the user via the operation unit 130 concerning the environmental information data stored in the heat flow DB 21, and stores the input. The manual input receiver 13 storing data that does not appear in the environmental information data acquired by the sensor 6 enables an increase in accuracy of the environmental information data.

The room information acquirer 14 acquires room information that is stored in the equipment DB 22 and indicates a configuration of the air-conditioning-target room A, and provides the acquired room information to the calculator 15. Here, the room information includes the shape of the room A, and positions of equipment involved with heat flows, the equipment including windows, lighting equipment, ventilation equipment, air conditioners, and the like located in the room A. Further, the room information may include information indicating heat flow amounts and the like of the lighting equipment, the ventilation equipment, and the like within the room A.

The calculator 15 calculates heat load data indicating heat flows in the air-conditioning-target room A on the basis of the air conditioning operation data acquired by the air conditioning operation data acquirer 11, the room information acquired by the room information acquirer 14, and the environmental information data acquired by the environmental information data acquirer 12. Specifically, the calculator 15 reads from the acquired room information the data indicating the layout of the room, and for each of the components (air conditioners, lighting equipment, ventilation equipment, doors, and the like) of the room, performs a simulation that from which components heat is provided to the room and from which components the particular heat flows to the exterior. During this simulation, the calculator 15 calculates on the basis of the stored air conditioning operation data the heat amounts provided from, or discharged from, the air conditioners. Further, the calculator 15 performs the simulation so as to match the stored environmental information data with respect to environmental conditions (temperature and humidity) of the positions where the sensors (sensor 6 and the like) are installed in the room. The calculator 15 performs the simulation that satisfies such conditions, calculates how heat of the room flows, and generates heat load data indicating the calculated heat flows. In particular, the calculator 15, via the operation unit 130 of the air conditioning operation analysis device 1, may receive from the user the operation input indicating a date and time that is a target of generation of the heat load data, and may generate the heat load data for the target date and time.

In the case in which the environmental information data of the target date and time is not stored in the heat flow DB 21 when the calculator 15 is generating the heat load data, the supplementer 16 supplements the environmental information data of the target date and time on the basis of the environmental information data stored in the heat flow DB 21. In the case in which the environmental information data required for the simulation is not stored in the heat flow DB 21, the calculator 15 performs the simulation using the environmental information data supplemented by the supplementer 16.

The estimator 17, on the basis of the heat load data calculated by the calculator 15 and the air conditioning capacity data stored in the equipment DB 22, estimates heat flows for the case of installing another air conditioner in place of the air conditioner that is currently installed. The equipment DB 22 stores air conditioning capacity data (power consumption, thermal efficiency, and the like) of the air conditioners that are currently installed, and stores the air conditioning capacity data of an air conditioner that is to be a candidate for installation in the room. The estimator 17, on the basis of the heat load data calculated by the calculator 15, the air conditioning capacity data of the air conditioners that are currently installed, and the air conditioning capacity data of the air conditioner that is to be the candidate for installation, generates estimate heat load data indicating heat flows in the case in which the air conditioner that is to be the candidate for installation is installed at the location of the air conditioner that is currently installed.

The outputter 18 outputs the heat load data calculated by the calculator 15. The form of the output may be a form that displays the heat load data as image data on the screen of the display 140 by outputting the data as image data to the display 140, for example. Alternatively, the heat load data may be output in the form of a hard copy by outputting to a printer connected to the air conditioning operation analysis device 1, for example, via the network interface 150, printing data that includes the heat load data. Further, in addition to the heat load data, the estimate heat load data estimated by the estimator 17 may be outputted by the outputter 18 in a form similar to that of the heat load data.

Figure 4A:
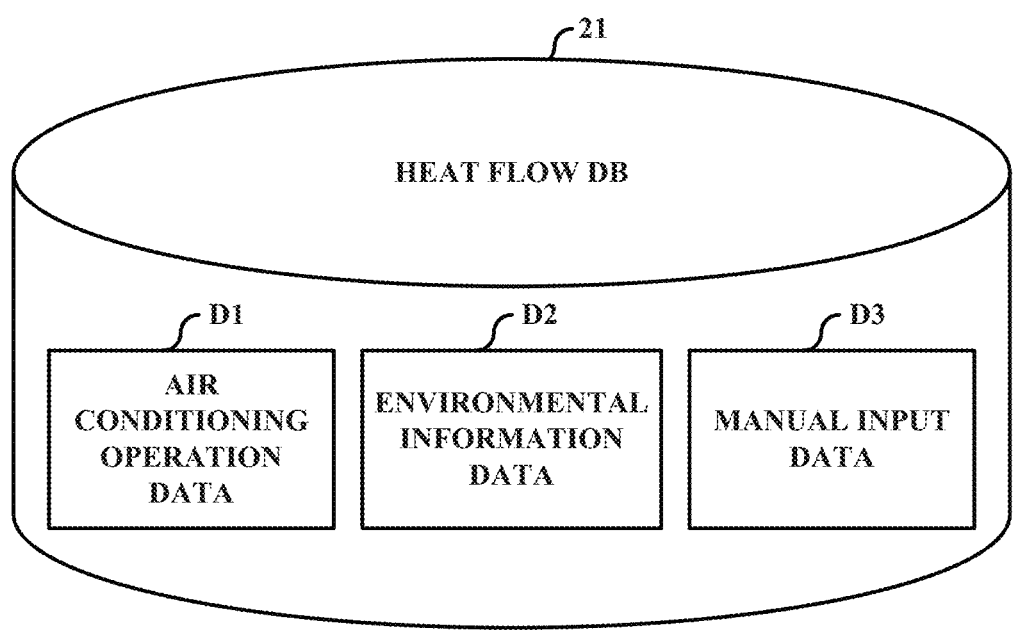
FIG. 4A is a drawing illustrating data content stored in a heat flow DB in the embodiment.
Figure 4B:
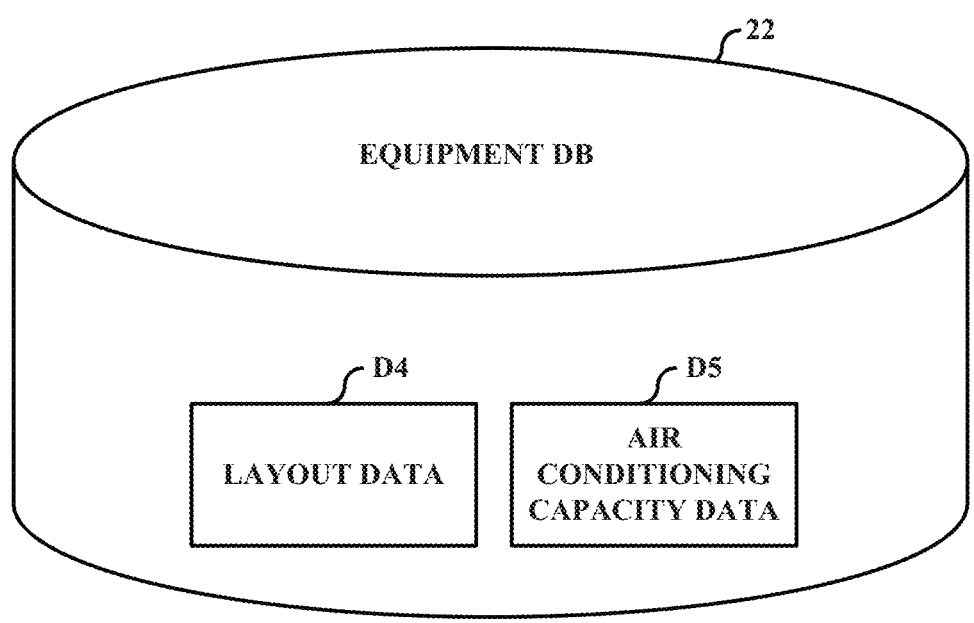
FIG. 4B is a drawing illustrating data content stored in an equipment DB in the embodiment.

In the aforementioned manner, the storage 120 stores the heat flow DB 21 and the equipment DB 22. Air conditioning operation data D1, environmental information data D2, and manual input data D3 are stored in the heat flow DB 21 as illustrated in FIG. 4A. Further, layout data D4 and air conditioning capacity data D5 are stored in the equipment DB 22 as illustrated in FIG. 4B. These data are described below with reference to the respective drawings.

Figure 5:
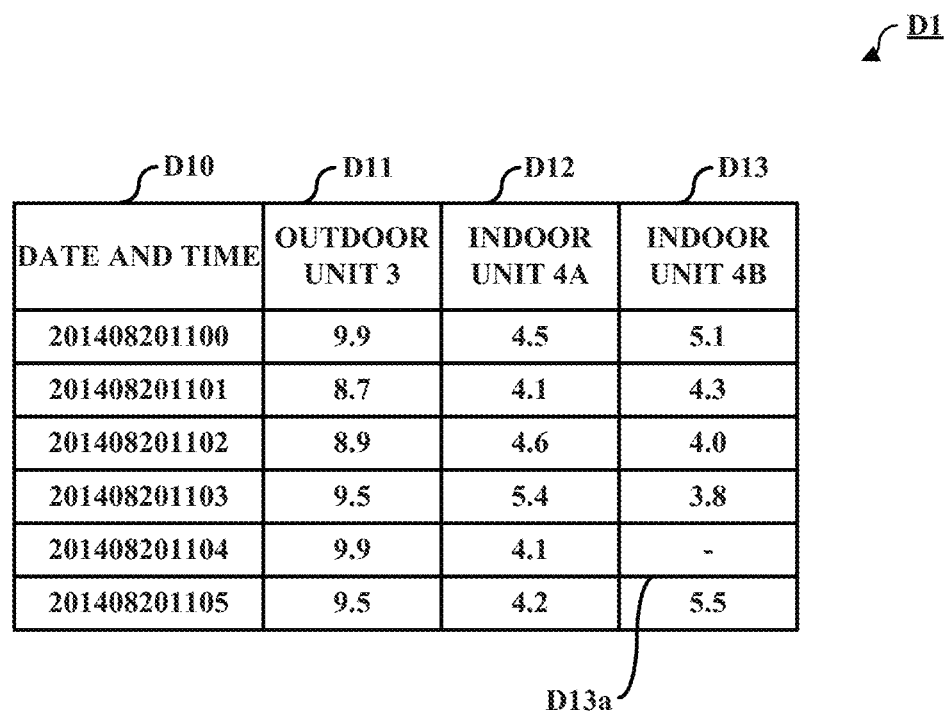
FIG. 5 is a drawing illustrating content of air conditioning operation data in the embodiment.

As illustrated in FIG. 5, the air conditioning operation data D1 is data repeatedly storing records linking together time data D10 indicating date and time and data indicating power consumption of each air conditioner (power consumption data D11 of the outdoor unit 3, power consumption data D12 of the indoor unit 4A, and power consumption data D13 of the indoor unit 4B). Upon receiving information indicating the air conditioning operation data transmitted from the operation actual results measurer 5, the air conditioning operation data acquirer 11 generates a record from the received air conditioning operation data and stores the generated record in the air conditioning operation data D1. Further, there are cases in which data is missing from the air conditioning operation data that is transmitted from the operation actual results measurer 5, and in such a case, the air conditioning operation data acquirer 11 generates a record that leaves the missing data blank and stores the generated record in the air conditioning operation data D1. As a result, a data missing portion D13a may be generated in the air conditioning operation data D1.

As illustrated in FIG. 6, the environmental information data D2 is data repeatedly storing records linking together time data D20 indicating date and time and data acquired by each of the sensors (data D21 from a first sensor, data D22 from a second sensor, and data D23 from a third sensor). Further, if the first sensor is a temperature-humidity meter, for example, due to the obtaining of data indicating temperature and data indicting humidity from the first sensor, the data D21 includes temperature data D211 and humidity data D212. The environmental information data acquirer 12 periodically acquires data from each of the connected sensors, and generates a record by linking together information indicating the date and time of data acquisition and the data acquired from each sensor, and the environmental information data acquirer 12 then stores the generated record in the environmental information data D2. Further, there are cases in which acquisition of data from some sensors fails during acquisition of the environmental information data. In such a case, the environmental information data acquirer 12 generates a record that leaves the non-acquirable data blank and stores the generated record in the environmental information data D2. As a result, a data missing portion D221a may be generated in the environmental information data D2.

The manual input data D3 is an optional element in the present embodiment, and is data that is input beforehand by the user regarding information that cannot be acquired by the operation actual results measurer 5 and the sensor 6. The manual input data D3, as one example, includes lighting data D31 and ventilation data D32 as indicated in FIG. 7. The lighting data D31 stores data indicating power consumption and brightness of every lighting equipment installed in the air-conditioning-target room A. Further, the ventilation data D32 stores data indicating an air-flow volume and a heat-exchange rate of every ventilation equipment installed in the air-conditioning-target room A.

Figure 8:
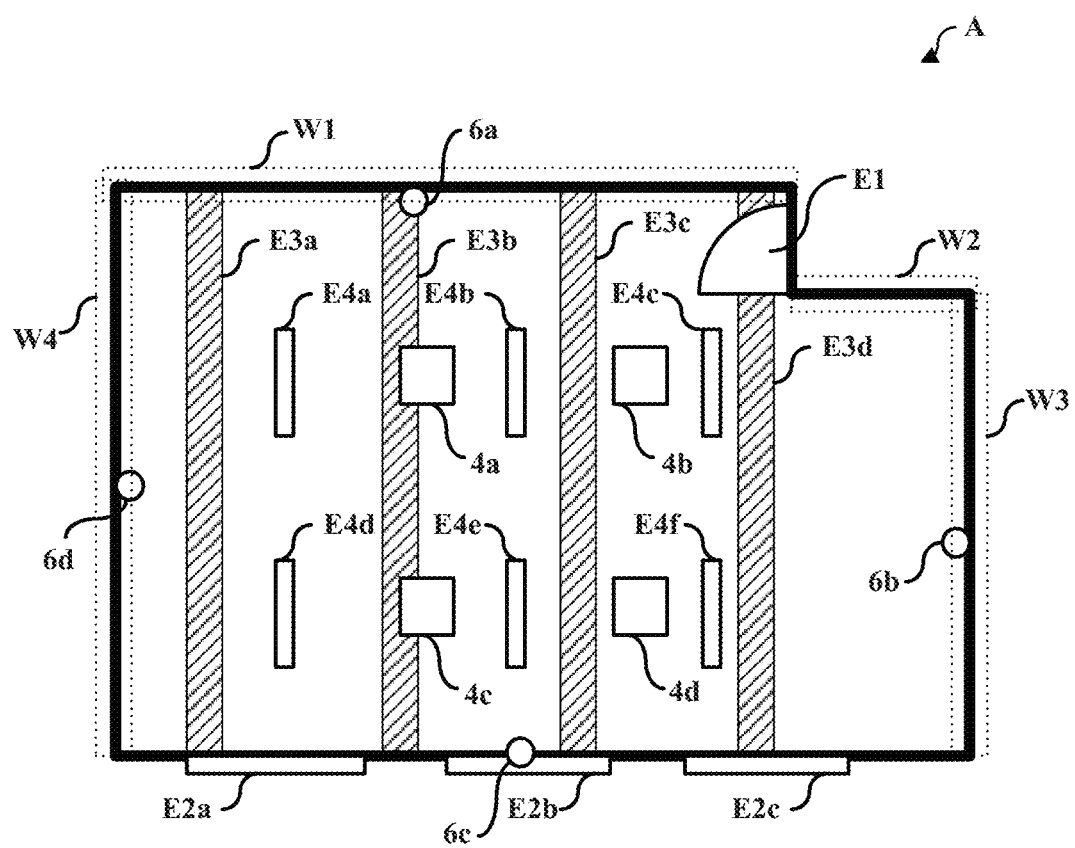
FIG. 8 is a drawing illustrating a shape of an air-conditioning-target room and an arrangement of components therein in the embodiment.

One example of the air-conditioning-target room A is illustrated in FIG. 8. In this example, in the room A surrounded by walls (walls W1 to W4, and the like), a door E1 is arranged in an upper right portion in the drawing, and a window E2a, a window E2b, and a window E2c are arranged in a lower portion. Further, lighting equipment E3a to E3d and ventilation equipment E4a to E4f are each arranged in the room A. Furthermore, sensors 6a to 6d are arranged, one sensor per wall, at each of four walls, and indoor units 4a to 4d are provided at a central portion of the room A. The layout data D4 stored in the equipment DB 22 stores data indicating the shape and structure of the room A and positions of the respective components. The layout data D4 is treated as a portion of the room information indicating the components of the air-conditioning-target room.

As illustrated in FIG. 9, the air conditioning capacity data D5 stores data indicating capacity of each of the air conditioners that are currently installed in the room A. Specifically, the air conditioning capacity data D5 stores data indicating thermal efficiency and power consumption during rated operation of each air conditioner, and also stores data including a drive frequency of the outdoor unit, an air-flow volume of the indoor unit, and the like.

Further, the air conditioning capacity data D5 may include data indicating capacity regarding a type of air conditioner that is considered to be installed in place of the air conditioner that is currently installed. Specifically, as illustrated in FIG. 10, the air conditioning capacity data D5 may store data indicating thermal efficiency and power consumption during rated operation of each air conditioner that is to be a candidate for installation, and also may store data including a drive frequency of the outdoor unit, an air-flow volume of the indoor unit, and the like.

The air conditioning operation analysis device 1 uses the hardware, functional components, data, and the like described heretofore to generate the heat load data indicating the heat flows. In this process, the air conditioning operation analysis device 1 stores the air conditioning operation data and the environmental information data by executing data storing processing illustrated in FIG. 11. The air conditioning operation analysis device 1 starts the data storing processing upon startup of the air conditioning operation analysis device 1 or together with the start of operation of the air conditioners. Further, the air conditioning operation analysis device 1 completes the data storing processing when the air conditioning operation analysis device 1 stops or when all the air conditioners connected thereto are stopped.

At the beginning of the data storing processing, the air conditioning operation analysis device 1 determines whether timing of data acquisition comes (step S110). Specifically, the air conditioning operation analysis device 1 verifies whether a time period is passed after the previous acquisition of the air conditioning operation data and the environmental information data, and when the time period is passed, determines that the timing of data acquisition comes. When determining that the time period is not yet past after the previous acquisition of the data (NO in step S110), the air conditioning operation analysis device 1 waits until the timing of data acquisition comes.

When determining that the timing of data acquisition comes (YES in step S110), the air conditioning operation analysis device 1 acquires and stores the air conditioning operation data (step S120). Specifically, the air conditioning operation analysis device 1 acquires the air conditioning operation data from the operation actual results measurer 5 and stores the acquired air conditioning operation data in the air conditioning operation data D1 stored in the storage 120.

Thereafter, the air conditioning operation analysis device 1 acquires and stores the environmental information data (step S130). Specifically, the air conditioning operation analysis device 1 acquires the environmental information data from each sensor that is connected via the network 7, and stores the acquired environmental information data in the environmental information data D2 stored in the storage 120.

Upon storing the environmental information data, the air conditioning operation analysis device 1 determines whether a completion condition is satisfied (step S140). In the present embodiment, the air conditioning operation analysis device 1 completes the data storing processing in accordance with a completion condition, for example, operation inputs to stop the air conditioning operation analysis device 1 made by a user and stoppage of all the connected air conditioners. When the determination is that the completion condition is not satisfied (NO in step S140), the processing by the air conditioning operation analysis device 1 returns to step S110, and the air conditioning operation analysis device 1 repeats the processing thereafter. Upon determining that the completion condition is satisfied (YES in step S140), the air conditioning operation analysis device 1 completes the data storing processing.

Figure 12:
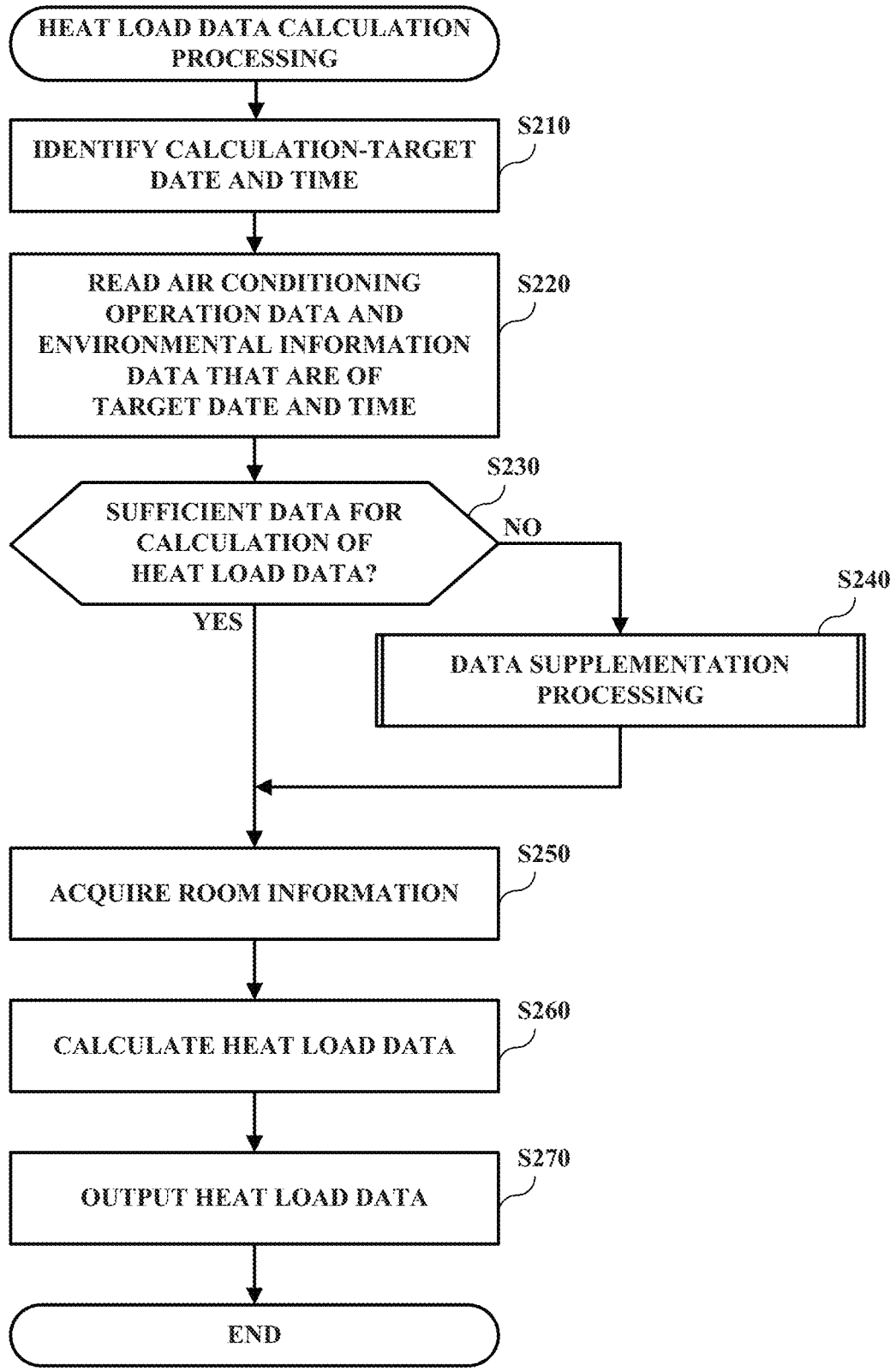
FIG. 12 is a flowchart illustrating content of heat load data calculation processing.

By continuously executing the data storing processing, the air conditioning operation analysis device 1 accumulates each of the air conditioning operation data and the environmental information data, and stores in the storage 120 the air conditioning operation data and the environmental information data as the air conditioning operation data D1 and the environmental information data D2, respectively. Thereafter, by executing the heat load data calculation processing illustrated in FIG. 12, the air conditioning operation analysis device 1 performs a simulation based on the accumulated data and generates and outputs heat load data indicating the heat flows. The air conditioning operation analysis device 1 may start the heat load data calculation processing upon an operation made as a trigger by the user, or may start the heat load data calculation processing automatically at predetermined times or periodically, such as once per month, and the like.

At the beginning of the heat load data calculation processing, the air conditioning operation analysis device 1 identifies a calculation-target date and time (step S210). For example, the air conditioning operation analysis device 1 may identify a date and time designated by contents of an operation performed by the user via the operation unit 130 as the calculation-target date and time. Further, if the heat load data calculation processing is executed automatically, the calculation-target date and time may be identified automatically on the basis of conditions.

Thereafter, the air conditioning operation analysis device 1 reads the air conditioning operation data and the environmental information data of the calculation-target date and time (step S220). Specifically, the air conditioning operation analysis device 1 accesses the heat flow DB 21 stored in the storage 120 and reads from the air conditioning operation data D1 the air conditioning operation data of the target date and time. Further, the air conditioning operation analysis device 1 reads the environmental information data of the target date and time from the environmental information data D2 in a similar manner.

Thereafter, the air conditioning operation analysis device 1 determines whether the read air conditioning operation data and the read environmental information data are sufficient for calculation of the heat load data (step S230). Such determination is performed due to the existence of cases, as previously described, in which missing portions (the data missing portion D13a and the data missing portion D221a) exist in the air conditioning operation data D1 and the environmental information data D2. The air conditioning operation analysis device 1 verifies whether there is a missing portion in the read air conditioning operation data and the read environmental information data, determines that the data is sufficient when there is no missing portion, and determines that the data is insufficient when there is a missing portion.

When the determination in step S230 is that there is no sufficient data for calculation of the heat load data (NO in step S230), the air conditioning operation analysis device 1 performs the data supplementation processing (step S240), thereby supplementing the missing data. Content of the data supplementation processing is described below.

When the determination in step S230 is that there is sufficient data for calculation of the heat load data (YES in step S230), or upon completion of the data supplementation processing, the air conditioning operation analysis device 1 acquires the room information (step S250). Specifically, the air conditioning operation analysis device 1 accesses the storage 120 and reads from the equipment DB 22 the room information, such as information indicating the shape of the room A, information of positions of the components in the room A, and the like.

Thereafter, the air conditioning operation analysis device 1 calculates the heat load data (step S260). Specifically, the air conditioning operation analysis device 1 performs a simulation based on the acquired air conditioning operation data, environmental information data and room information, and then calculates heat load data that reproduces the heat flows in the room A and stores the calculated heat load data in the storage 120.

Thereafter, the air conditioning operation analysis device 1 outputs the calculated heat load data (step S270). The form of the output may be a form that displays on the display 140 an image indicating the heat load data and/or a form that stores the heat load data in the storage 120. Further, the heat load data may be transmitted to the other device via the network interface 150. Upon output of the heat load data, the air conditioning operation analysis device 1 completes the heat load data calculation processing.

By executing the heat load data calculation processing, the air conditioning operation analysis device 1 calculates the heat load data indicating the heat flows based on data (the air conditioning operation data and the environmental information data) reflecting the actual air conditioning operating conditions. During the heat load data calculation processing, when it becomes clear that data is missing (NO in step S230), the air conditioning operation analysis device 1 can use the data supplementation processing to supplement the missing portion of the data and can calculate using the supplemented data the heat load data. The data supplementation processing is described below.

When the determination in step S230 of the heat load data calculation processing is that there is no sufficient data for calculation of the heat load data, the air conditioning operation analysis device 1 starts the data supplementation processing illustrated in FIG. 13.

At the beginning of the data supplementation processing, the air conditioning operation analysis device 1 identifies the supplementation-target data (step S241). Specifically, the air conditioning operation analysis device 1 identifies missing portions of the data read in step S220 of the heat load data calculation processing, and identifies one portion of such missing portions as the supplementation-target data.

Thereafter, the air conditioning operation analysis device 1 supplements the supplementation-target data on the basis of the stored data (step S242). The air conditioning operation analysis device 1, as may be required, accesses the heat flow DB 21 and supplements data for the missing portion. The term "supplement" is taken to mean estimating, on the basis of other stored data, the data lost due to transmission error and the like, and using such estimated data to supplement the data for the missing portion.

In the present embodiment, the air conditioning operation analysis device 1 supplements the missing data by weighted summation of the stored data. In a specific example, if four temperature sensors (sensors 6a to 6d) are arranged in the room A, and temperature data Td to be acquired by the sensor 6d among these temperature sensors is missing, the air conditioning operation analysis device 1 uses temperature data Ta acquired by the sensor 6a, temperature data Tb acquired by the sensor 6b, and temperature data Tc acquired by the sensor 6c, to calculate Td by the below-listed Equation 1 and perform supplementation.

[Equation 1]

$$Td = w_1 Ta + w_2 Tb + w_3 Tc \qquad \text{(Equation 1)}$$

Here, $w_1$, $w_2$, and $w_3$ are weighting coefficients. The weighting coefficients may be calculated by the air conditioning operation analysis device 1 on the basis of the room information, or alternatively, may be defined beforehand. Furthermore, rather than only performing supplementation based on data acquired from the same type of sensor, another type of data may be used if such data correlates. For example, in the case of supplementation of temperature data, if there is a correlation between temperature and humidity, data including the humidity data may be used for weighted summation.

Upon supplementation of the supplementation-target data, the air conditioning operation analysis device 1 determines whether all of the missing data is supplemented (step S243). When the determination is that all of the missing data is not supplemented (NO in step S243), the processing by the air conditioning operation analysis device 1 returns to step S241, and the air conditioning operation analysis device 1 repeats the processing thereafter. Upon determining that all of the missing data is supplemented (YES in step S243), the air conditioning operation analysis device 1 completes the data supplementation processing.

In this manner, even if data is missing, the air conditioning operation analysis device 1 supplements the missing portion and then generates the heat load data. Thus even if data is missing, the simulation based on data close to actual conditions can be performed, and heat load data that reproduces the actual heat flows with high accuracy can be calculated.

In the aforementioned example, when data from a single sensor is missing, the missing data is supplemented on the basis of data acquired from the other sensors. However, the form of supplementation is not limited to this basis. For example, when data from a single sensor is missing, if data acquired beforehand and afterward from this sensor is stored, the missing data may be supplemented on the basis of such stored data.

As illustrated in FIG. 14 as an example, the calculated heat load data indicates the heat load (heat flows) supplied or flowing from each component. The air conditioning operation analysis device 1, on the basis of the air conditioning operation data, calculates the heat flow supplied from each of the indoor units. Then the air conditioning operation analysis device 1 performs a simulation by combining the information of the heat flows supplied from the air conditioners, the information (room information) indicating a configuration of the room such as the layout of the room, and the information (environmental information data) indicating actual temperature changes and the like, thereby calculating the amount of heat (heat flows) incoming and outgoing through each of the components (walls, windows, ceiling, floor, and the like) of each room. Further, the heat flows through the lighting equipment and the ventilation equipment may be optionally calculated on the basis of the manual input data D3.

In this manner, the air conditioning operation analysis device 1 according to the present embodiment can calculate the heat load data indicating incoming and outgoing (flow) of heat through each of the components. Due to performance of the simulation combining the data (air conditioning operation data) including actual running states of the air conditioners, the information (room information) indicating positions of the components and the shape of the room, and the data (environmental information data) measured in the environment, the air conditioning operation analysis device 1 can calculate the information (heat load data) indicating the heat flows with high accuracy. This enables more accurate calculation of the heat flows in the room.

Figure 15:
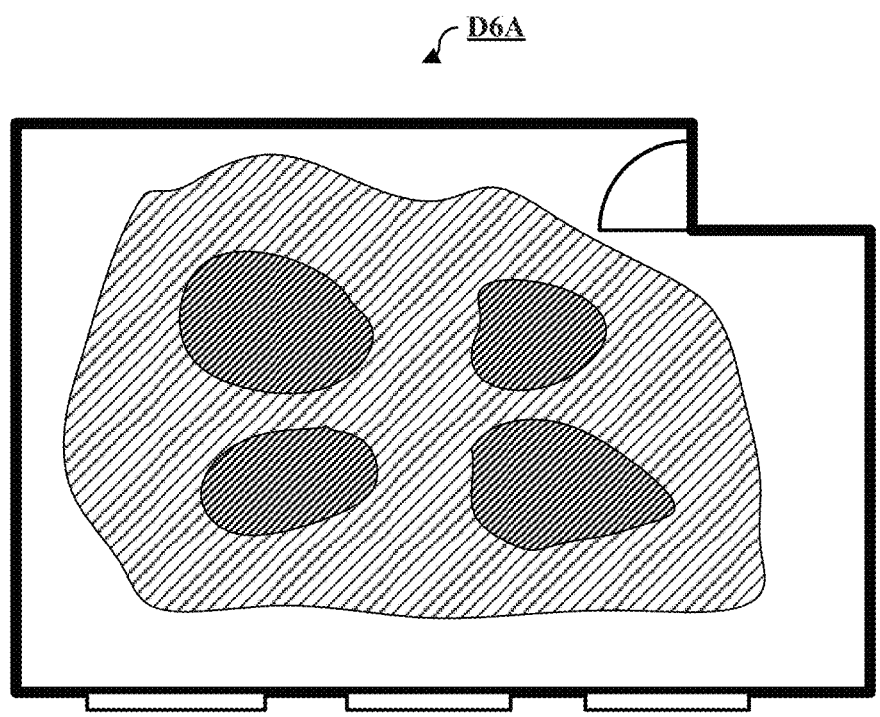
FIG. 15 is a drawing illustrating temperature distribution data calculated on the basis of the heat load data.

Further, by combining the heat flows of the respective components, the air conditioning operation analysis device 1 can calculate image data indicating a temperature distribution of the room. On the basis of the position of each component and the heat amount supplied by such component, the air conditioning operation analysis device 1, by performing a simulation, calculates for each position in the room the heat flows, such as the direction and the magnitude of the heat flows. On the basis of the calculated heat flows and the temperature data of each sensor position stored in the environmental information data, two-dimensional data (temperature distribution data) indicating the temperatures at each position of the room is calculated. The air conditioning operation analysis device 1 can generate an image that overlays the calculated temperature distribution data on data indicating the layout of the room, and can output to the display 140 the image as temperature distribution data D6A as illustrated in FIG. 15.

Further, rather than only the air conditioning capacity data of the air conditioners that are currently installed, the air conditioning capacity data of air conditioners that are to be candidates for installation thereafter in the room is also stored in the equipment DB 22 of the air conditioning operation analysis device 1 in the aforementioned manner. Thus the air conditioning operation analysis device 1 can also simulate running states in the case in which a new air conditioner is installed as a substitute for the air conditioner that is currently installed.

Figure 16:
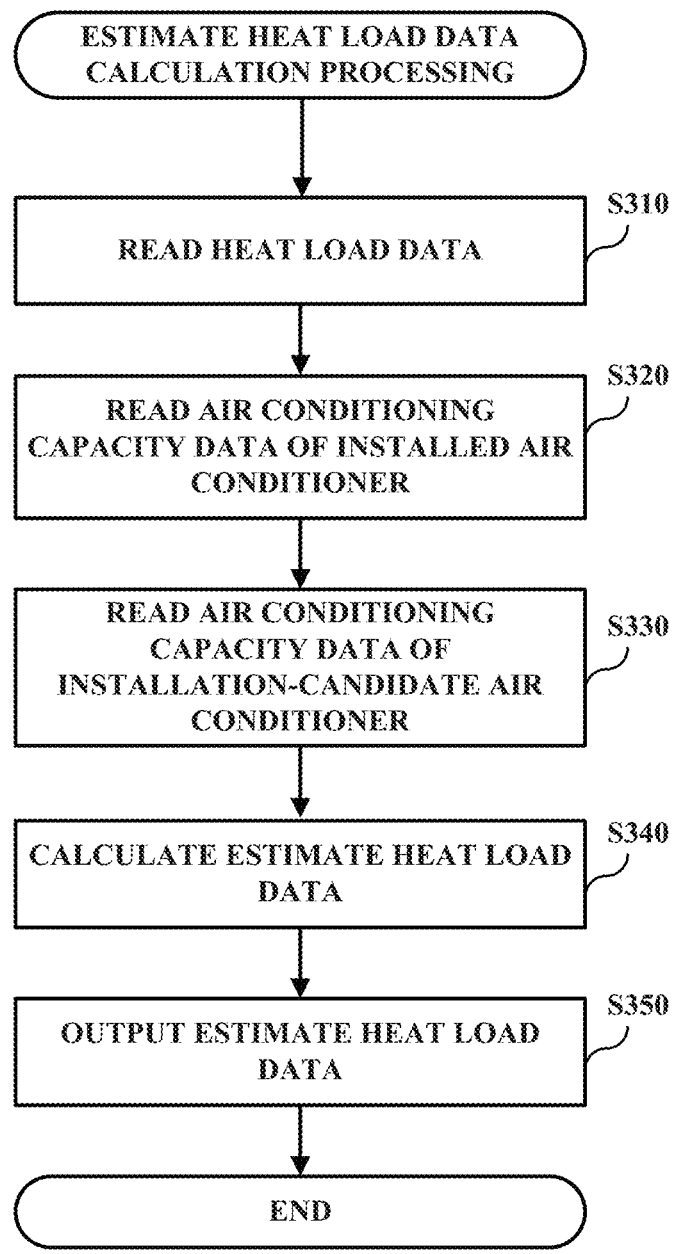
FIG. 16 is a flowchart illustrating content of estimate heat load data calculation processing.

When the user performs an operation providing an instruction for calculation of the estimate heat load data, the air conditioning operation analysis device 1 starts the estimate heat load data calculation processing illustrated in FIG. 16. Further, during the providing of the instruction for calculation of the estimate heat load data, the user operates the operation unit 130 to input information identifying the air conditioner that is to be the candidate for installation.

At the beginning of the estimate heat load data calculation processing, the air conditioning operation analysis device 1 reads the previously stored heat load data (step S310). Further, when the heat load data is not stored in the storage 120 at that time, the air conditioning operation analysis device 1 may execute the heat load data calculation processing and calculate the heat load data.

Thereafter, the air conditioning operation analysis device 1 reads the air conditioning capacity data of the installed air conditioner (step S320). The air conditioning operation analysis device 1 accesses the equipment DB 22 in the storage 120 and reads the air conditioning capacity data of the installed air conditioner.

Thereafter, the air conditioning operation analysis device 1 reads the air conditioning capacity data of an installation-candidate air conditioner (step S330). The air conditioning operation analysis device 1 accesses the equipment DB 22 in the storage 120 and reads the air conditioning capacity data of the installation-candidate air conditioner.

Thereafter, the air conditioning operation analysis device 1 calculates the estimate heat load data (step S340). Specifically, the air conditioning operation analysis device 1 reads the heat flows of the installed air conditioner stored in the heat load data and the power consumption of the installed air conditioner in the stored air conditioning operation data. Then the air conditioning operation analysis device 1 performs a simulation to find what power consumption allows the installation-candidate air conditioner to enable reproduction of the stored heat flows. Using the results of the simulation, the air conditioning operation analysis device 1 calculates the power consumption of a case when the heat flow that is most nearly approaches the stored heat flows can be reproduced, calculates the heat flows under such a condition, and stores the calculated data as the estimate heat load data.

Thereafter, the air conditioning operation analysis device 1 outputs the calculated estimate heat load data (step S350). The form of the output is similar to the form that is used when outputting the heat load data, and a method such as the method of displaying on the display 140 the image indicating the estimate heat load data, the method of storing the estimate heat load data to the storage 120 or the like is used. Upon output of the estimate heat load data, the air conditioning operation analysis device 1 completes the estimate heat load data calculation processing.

In this manner, the air conditioning operation analysis device 1 calculates, on the basis of the heat load data indicating the heat flows in the case of operation of the air conditioner that is currently installed, the estimate heat load data indicating the heat flows in the case of installation and operation of the other air conditioner that is to be the candidate for installation, and outputs the estimate heat load data. Thus when contemplating replacement of an air conditioner, for making the determination, materials can be provided relating to selection of the device type and an estimated change in power consumption before and after replacement.

Figure 17:
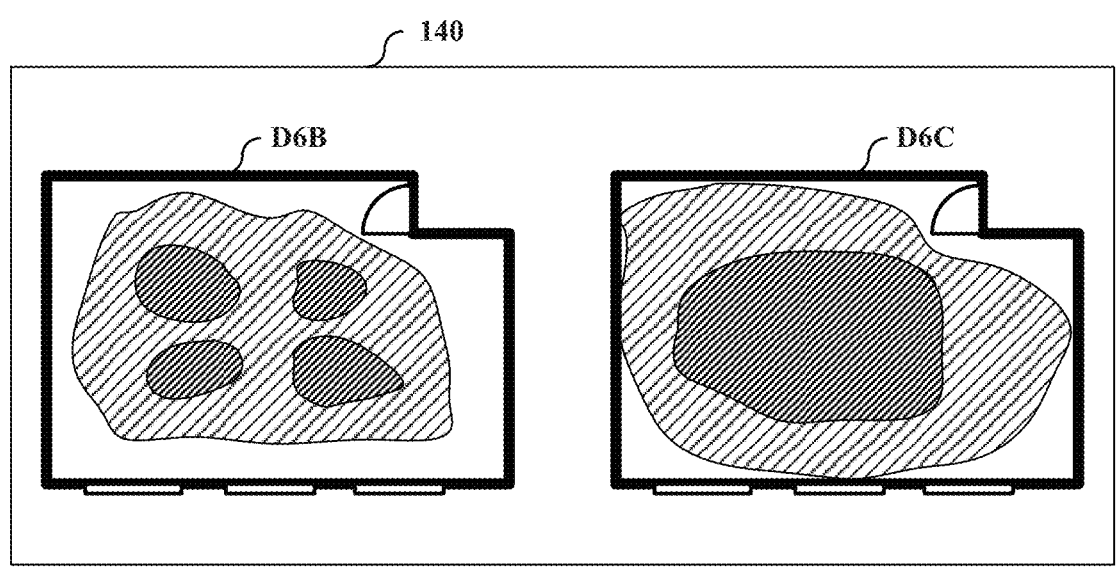
FIG. 17 is a drawing illustrating a screen displaying two temperature distribution data sets in a form that enables comparison by a user.

The air conditioning operation analysis device 1 can generate the temperature distribution data of the room by performing a simulation of the heat flows within the room on the basis of the estimate heat load data, in a similar manner as used for the heat load data. In this case, as illustrated in FIG. 17 for example, by display on the display 140 of temperature distribution data D6B for the case of operation of the existing air conditioner side-by-side with temperature distribution data D6C for the case of installation and operation of the installation-candidate air conditioner, the user can easily make a comparison.

In the air conditioning operation analysis device 1 according to the present embodiment, the manual input receiver 13 is an optional component, and the air conditioning operation analysis device 1 can generate the heat load data without the manual input receiver 13. However, accuracy of the calculated heat load data can be further increased when the simulation is performed after input of numeric data that was previously fixed concerning, in particular, components (lighting equipment and the like) for which changes in the heat flows are expected to be small. Further, although data received by the manual input receiver 13 is stored in the heat flow DB 21 in the present embodiment, this data may be stored in the equipment DB 22, or this data may be stored in the storage 120 as separate data.

Figure 18:
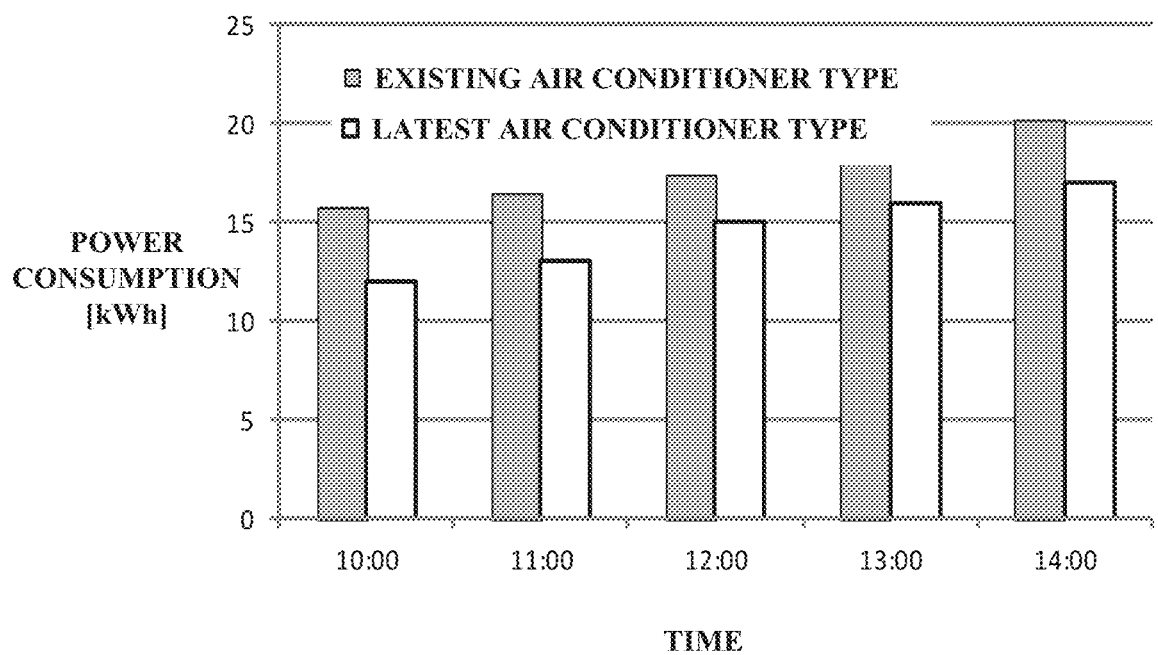
FIG. 18 is a drawing illustrating a screen displaying power consumption included in the air conditioning operation data and power consumption calculated by the estimate heat load data calculation processing in a comparable form.

In the aforementioned manner, in step S340 of the estimate heat load data calculation processing, the air conditioning operation analysis device 1 calculates the power consumption for the case of installation and operation of the other air conditioner that is to be the candidate for installation. The air conditioning operation analysis device 1 can store the power consumption calculated in the estimate heat load data calculation processing and can provide the calculated power consumption to the user as material. As illustrated in FIG. 18 for example, the material is displayed on the display 140 in the form that enables comparison between the power consumption stored in the air conditioning operation data D1 and the power consumption calculated by the estimate heat load data calculation processing, and thus the user can be aware of a difference in the power consumption that occurs before versus after replacement of the air conditioner.

Further, in the aforementioned embodiment, a program to be executed by the air conditioning operation analysis device 1 may be stored in a non-transitory computer-readable recording medium, such as a compact disc read only memory (CD-ROM), a digital versatile disc (DVD), a magneto-optical disc (MO), a USB memory, a memory card, and the like for distribution. Also, by installing the program on a special or general-purpose computer, the computer may also function as the device in the various embodiments and modified examples.

The above-described program may be stored on a disk device or the like of a server device on a communication network such as the Internet to enable the program to be downloaded to the computer, for example by superimposing the program onto a carrier wave. Moreover, the above-described processing can be achieved even by execution while the program is transferred through the communication network. Furthermore, the above-described processing can be achieved by executing all or part of the program on the server device, and executing the program while sending and receiving by the computer the information relating to such processing through the communication network.

Moreover, if the above-described functions are executed by sharing the functions between an operating system (OS) and application programs, or are executed by both the OS and the application programs in cooperation with each other, the non-OS portion alone may be stored and distributed in the above-described recording medium, or alternatively, may be, for example, downloaded to the computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for an air conditioning control system installed in a building and the like.

REFERENCE SIGNS LIST

1 Air conditioning operation analyzer
2, 7 Network
3 Outdoor unit
4A, 4B Indoor unit
4a to 4d Indoor unit
5 Operation actual results measurer
6 Sensor
6a to 6d Sensor
11 Air conditioning operation data acquirer
12 Environmental information data acquirer
13 Manual input receiver
14 Room information acquirer
15 Calculator
16 Supplementer
17 Estimator
18 Outputter
21 Heat flow DB
22 Equipment DB
100 Air conditioning analysis system
110 Controller
111 CPU
112 RAM 113 ROM
120 Storage
130 Operation unit
140 Display
150 Network interface
160 Internal bus
A Room
E1 Door
E2a to E2c Window
E3a to E3d Lighting equipment
E4a to E4f Ventilation equipment
W1 to W4 Wall

The invention claimed is:

1. An air conditioning operation analysis device comprising:
   at least one memory configured to store a program;
   at least one processor configured to access the at least one memory to read the program, the at least one processor being operable in accordance with the program; and
   a storage configured to store (i) air conditioning capacity data of an installed air conditioner that is installed in a room, and (ii) air conditioning capacity data of an installation-candidate air conditioner that is a candidate for installation in the room, wherein
   the program is configured to cause the at least one processor to:
      acquire air conditioning operation data of the installed air conditioner;
      acquire room information indicating a configuration of the room;
      acquire environmental information data from at least one sensor arranged in the room;
      output heat load data that indicates a heat flow of each component of the room and is calculated based on the acquired air conditioning operation data, the acquired room information, and the acquired environmental information data; and
      output estimate heat load data which indicates a heat flow of the room that is estimated based on (i) the air conditioning capacity data of the installed air conditioner stored in the storage, (ii) the air conditioning capacity data of the installation-candidate air conditioner stored in the storage, and (iii) the output heat load data, the heat flow of the room being for a case in which the installation-candidate air conditioner is installed at a location where the installed air conditioner is installed.

2. The air conditioning operation analysis device according to claim 1, wherein
   the program is further configured to cause the at least one processor to
      receive an input by a user, the input indicating a date and time targeted for calculation of the heat load data, and
      output the heat load data at the inputted date and time.

3. The air conditioning operation analysis device according to claim 2, wherein
   the program is further configured to cause the at least one processor to
      supplement, based on the acquired environmental information data, the environmental information data of a date and time for which the environmental information data is not acquired, and
      output the heat load data that is calculated using the supplemented environmental information data.

4. An air conditioning operation analysis device comprising:
   at least one memory configured to store a program;
   at least one processor configured to access the at least one memory to read the program, the at least one processor being operable in accordance with the program; and
   a storage configured to store (i) air conditioning capacity data of an installed air conditioner that is installed in a room, and (ii) air conditioning capacity data of an installation-candidate air conditioner that is a candidate for installation in the room, wherein
   the program is configured to cause the at least one processor to
      output heat load data that indicates a heat flow of each component of the room and is calculated based on (i) air conditioning operation data of the installed air conditioner, (ii) room information indicating a configuration of the room, and (iii) environmental information data acquired by at least one sensor arranged in the room, and
      output estimate heat load data which indicates a heat flow of the room that is estimated based on (i) the air conditioning capacity data of the installed air conditioner stored in the storage, (ii) the air conditioning capacity data of the installation-candidate air conditioner stored in the storage, and (iii) the output heat load data, the heat flow of the room being for a case in which the installation-candidate air conditioner is installed at a location where the installed air conditioner is installed.

5. A non-transitory computer-readable recording medium storing a program for execution in a computer of an air conditioning operation analysis device including a storage configured to store (i) air conditioning capacity data of an installed air conditioner that is installed in a room, and (ii) air conditioning capacity data of an installation-candidate air conditioner that is a candidate for installation in the room, the program configured to cause the computer to:
   acquire air conditioning operation data of the installed air conditioner;
   acquire room information indicating a configuration of the room;
   acquire environmental information data from at least one sensor arranged in the room;
   output heat load data that indicates a heat flow of each component of the room and is calculated based on the acquired air conditioning operation data, the acquired room information, and the acquired environmental information data; and
   output estimate heat load data which indicates a heat flow of the room that is estimated based on (i) the air conditioning capacity data of the installed air conditioner stored in the storage, (ii) the air conditioning capacity data of the installation-candidate air conditioner stored in the storage, and (iii) the output heat load data, the heat flow of the room being for a case in which the installation-candidate air conditioner is installed at a location where the installed air conditioner is installed.

6. The air conditioning operation analysis device according to claim 1, wherein the room information includes position information indicating a position of each component in the room.

7. The air conditioning operation analysis device according to claim 2, wherein the room information includes position information indicating a position of each component in the room.

8. The air conditioning operation analysis device according to claim 3, wherein the room information includes position information indicating a position of each component in the room.

9. The air conditioning operation analysis device according to claim 4, wherein the room information includes position information indicating a position of each component in the room.

* * * * *